United States Patent
Spottswood et al.

(10) Patent No.: US 9,930,112 B2
(45) Date of Patent: Mar. 27, 2018

(54) MAINTAINING SYSTEM FIRMWARE IMAGES REMOTELY USING A DISTRIBUTE FILE SYSTEM PROTOCOL

(75) Inventors: Jason Spottswood, Houston, TX (US); Darren J Cepulis, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 85 days.

(21) Appl. No.: 14/369,760

(22) PCT Filed: Feb. 21, 2012

(86) PCT No.: PCT/US2012/025928
§ 371 (c)(1),
(2), (4) Date: Jun. 30, 2014

(87) PCT Pub. No.: WO2013/126046
PCT Pub. Date: Aug. 29, 2013

(65) Prior Publication Data
US 2014/0372560 A1 Dec. 18, 2014

(51) Int. Cl.
*G06F 15/16* (2006.01)
*H04L 29/08* (2006.01)
(Continued)

(52) U.S. Cl.
CPC ............ *H04L 67/1097* (2013.01); *G06F 8/63* (2013.01); *G06F 8/65* (2013.01); *H04L 67/1095* (2013.01);
(Continued)

(58) Field of Classification Search
CPC ........... G06F 8/65; G06F 8/665; G06F 21/572
(Continued)

(56) References Cited

U.S. PATENT DOCUMENTS

| | | | |
|---|---|---|---|
| 6,865,655 B1 * | 3/2005 | Andersen | ............ G06F 11/1453 707/999.202 |
| 7,546,487 B2 | 6/2009 | Marisetty et al. | |

(Continued)

FOREIGN PATENT DOCUMENTS

| | | |
|---|---|---|
| CN | 1894661 A | 1/2007 |
| JP | 2009230399 | 10/2009 |

(Continued)

OTHER PUBLICATIONS

International Searching Authority, The International Search Report and the Written Opinion, dated Oct. 29, 2012, 11 Pages.

(Continued)

*Primary Examiner* — Hieu Hoang
(74) *Attorney, Agent, or Firm* — Dhand Law PC

(57) ABSTRACT

Maintaining system firmware images remotely using a distributed file system protocol is described. A method of preserving a system firmware image on a computer includes identifying that system firmware on the computer is to be updated with a new image, identifying an original image of the system firmware using a management processor of the computer, establishing a network connection to a remote storage system through a network interface of the computer using the management processor, sending the original image through the network connection to the remote storage system using a distributed file system protocol.

20 Claims, 5 Drawing Sheets

(51) Int. Cl.
  *G06F 9/445*  (2018.01)
  *H04L 29/06*  (2006.01)
  *G06F 9/50*  (2006.01)

(52) U.S. Cl.
  CPC ............ *H04L 67/34* (2013.01); *H04L 69/161* (2013.01); *G06F 9/5072* (2013.01); *H04L 67/327* (2013.01)

(58) Field of Classification Search
  USPC .................................................. 709/217, 223
  See application file for complete search history.

(56) References Cited

U.S. PATENT DOCUMENTS

| | | | |
|---|---|---|---|
| 7,552,217 B2 | 6/2009 | Mihm et al. | |
| 7,761,734 B2* | 7/2010 | Ellsworth | G06F 8/60 714/15 |
| 7,900,058 B2 | 3/2011 | Mabayoje et al. | |
| 2002/0049862 A1* | 4/2002 | Gladney | H04L 12/2854 709/250 |
| 2004/0230963 A1* | 11/2004 | Rothman | G06F 8/65 717/168 |
| 2005/0228888 A1* | 10/2005 | Mihm | G06F 8/65 709/227 |
| 2005/0229173 A1 | 10/2005 | Mihm et al. | |
| 2006/0143600 A1* | 6/2006 | Cottrell | G06F 21/572 717/168 |
| 2007/0002730 A1* | 1/2007 | Lu | G06F 11/0793 370/216 |
| 2007/0055968 A1* | 3/2007 | Rader | G06F 8/65 717/168 |
| 2008/0222604 A1 | 9/2008 | Murphy | |
| 2008/0295087 A1* | 11/2008 | Kang | G06F 8/65 717/168 |
| 2009/0019535 A1* | 1/2009 | Mishra | G06Q 10/00 726/12 |
| 2009/0217255 A1 | 8/2009 | Troan | |
| 2009/0222650 A1 | 9/2009 | Chen | |
| 2010/0186007 A1* | 7/2010 | Jeong | G06F 8/60 717/170 |
| 2011/0041003 A1* | 2/2011 | Pattar | H04W 12/10 714/4.3 |
| 2011/0179406 A1* | 7/2011 | Ohama | G06F 8/665 717/168 |
| 2011/0238792 A1 | 9/2011 | Phillips et al. | |
| 2011/0302572 A1* | 12/2011 | Kuncoro | G06F 8/66 717/171 |
| 2012/0054712 A1* | 3/2012 | Melvin, Jr. | G05B 19/0426 717/101 |
| 2012/0246628 A1* | 9/2012 | Li | G06F 8/65 717/168 |
| 2012/0254852 A1* | 10/2012 | Emaru | G06F 8/60 717/173 |
| 2012/0278795 A1* | 11/2012 | Bouchier | G06F 8/65 717/170 |
| 2013/0046944 A1* | 2/2013 | Domyo | G06F 11/1453 711/162 |

FOREIGN PATENT DOCUMENTS

| | | |
|---|---|---|
| KR | 100515890 | 9/2005 |
| WO | WO-0225438 A1 | 3/2002 |

OTHER PUBLICATIONS

Extended European Search Report dated Sep. 23, 2015; Application No. 12869329.8; 7 pages.

* cited by examiner

MAINTAINING SYSTEM FIRMWARE IMAGES REMOTELY USING A DISTRIBUTE FILE SYSTEM PROTOCOL

BACKGROUND

Computer systems include non-volatile memory to store the first code executed when powered on or "booted". This non-volatile memory can be referred to as "firmware". The code of the firmware can provide a firmware interface, such as a basic input/output system (BIOS), unified extensible firmware interface (UEFI), or the like. At least a portion of the code of the firmware can be updatable. The current state of updateable code in the firmware is referred to as an "image." Thus, a current image of the firmware can be replaced with a new image. A firmware update process can involve erasing and reprogramming non-volatile memory of the firmware.

After a firmware update, a computer system may fail to boot. For example, the new image of the firmware can be corrupted during the update process, and/or can include errors or "bugs" that prevent the computer from booting and/or operating properly. In such case, a user of the computer system can update the firmware with a replacement image known to boot the computer system, such as the original image that existed before updating to the new image. It is often the case, however, that the original image is no longer readily available, having been replaced by the new image. Thus, the user must perform additional work to locate a replacement image and perform the update process again.

BRIEF DESCRIPTION OF THE DRAWINGS

Some embodiments of the invention are described with respect to the following figures.

DETAILED DESCRIPTION

Maintaining system firmware images remotely using a distributed file system protocol is described. In an embodiment, a system firmware image of a computer system is preserved in the case of a firmware update to a new image. During an update, a management processor of the computer identifies the original image of the system firmware. The management processor then establishes a network connection to a remote storage system through a network interface. The management processor sends the original image of the system firmware to the remote storage system using a distributed file system protocol. In this manner, the original image of the system firmware is preserved by the remote storage system. Many computer systems can store firmware images to the remote storage system such that a system firmware repository is produced. The firmware repository can include many different versions of system firmware images (e.g., providing a log of prior versions). If after a system firmware update a computer fails to boot or otherwise operate properly, the management processor can obtain replacement firmware from the remote storage system using the distributed file system protocol. The system firmware can be updated with the replacement image automatically or through user interaction. In case of user interaction, the user can search through or "browse" the system firmware repository to select a desired replacement image.

In some cases, a computer system may include a larger non-volatile memory for the system firmware in order to store more than one image (e.g., a known working image) for redundancy. However, the non-volatile memory has a specific capacity for storing a definite number of images. Additionally, a larger non-volatile memory per each computer is more expensive. Embodiments described herein provide a central system firmware repository that can be shared among multiple computer systems. There is no need for an individual computer to store prior images of system firmware for redundancy. Further, the remote storage system can have an essentially unlimited capacity for storing any number of firmware images. Embodiments of the invention can be understood with reference to the follow example implementations.

Figure 1:
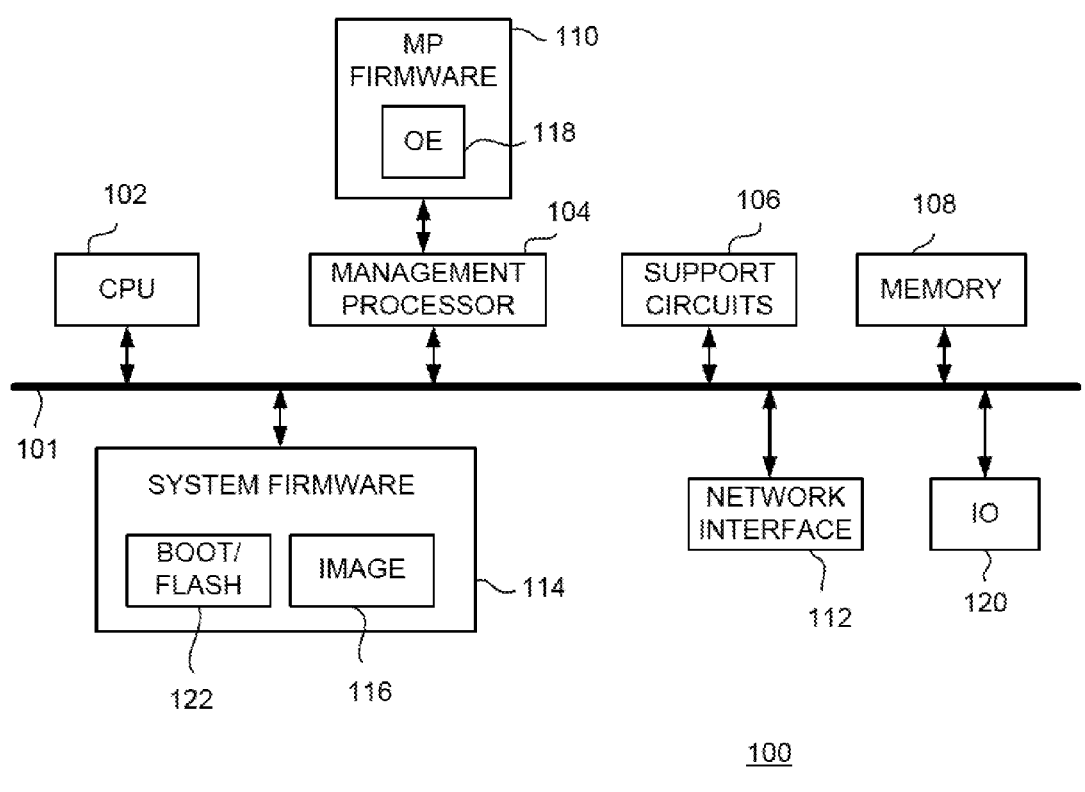
FIG. 1 is a block diagram of a computer system according to an example implementation.

FIG. 1 is a block diagram of a computer system 100 according to an example implementation. The computer system 100 includes a central processing unit (CPU) 102, a management processor 104, various support circuits 106, memory 108, a network interface 112, various input/output (IO) circuits 120, a system firmware 114, and interconnect circuits 101. The interconnect circuits 101 can provide busses, bridges, and the like to facilitate communication among the components of the computer system 100. The CPU 102 can include any type of microprocessor known in the art. The support circuits 106 can include cache, power supplies, clock circuits, data registers, and the like. The memory 108 can include random access memory, read only memory, cache memory, magnetic read/write memory, or the like or any combination of such memory devices. The network interface 112 can include circuits to facilitate communication using various protocols, such as transmission control protocol/internet protocol (TCP/IP) or like type transport/internet layer protocols over Ethernet or like type link layer protocols.

The management processor 104 can include any type of microprocessor, microcontroller, microcomputer or the like. The management processor 104 provides an interface between a system management environment and the hardware components of the computer system 100, including the CPU 102, the support circuits 106, the memory 108, the network interface 112, the IO circuits 120, and/or the system firmware 114. In an example, the management processor 104 is coupled to firmware 110 (referred to as "MP firmware"). The MP firmware 110 can include a non-volatile memory storing code that when executed by the management processor 104 provides an operating environment (OE) 118. The OE 118 can perform various system management functions, such as monitor temperature, monitor and control fan speeds, monitor power status, monitor operating system (OS) status, and the like. As described herein, the OE 118 can also be used to establish a network connection with remote storage system for storing and retrieving system firmware images. Also, the OE 118 can be used to update the system firmware 114. In some implementations, the management processor 104 can be referred to as a baseboard management controller (BMC). The management processor 104 and its functionality are separate from that of the CPU 102.

The system firmware 114 can include a non-volatile memory storing code for execution by the CPU 102. An updateable portion of the code can provide a firmware interface for the CPU 102 and is referred to as an image 116 of the system firmware 114. The firmware interface can be a BIOS, UEFI, or the like. The system firmware 114 can also include code first executed by the CPU 102 upon boot or reset referred to as "boot code", and can include code for updating the image 116 of the system firmware 114 referred to as "flash": code ("boot/flash 122"). The term "non-volatile memory" as used herein can refer to any type of non-volatile storage. Examples include read only memory (ROM), electronically eraseable and programmable ROM (EEPROM), FLASH memory, ferroelectric random access memory (F-RAM), and the like, as well as combinations of such devices.

Figure 2:
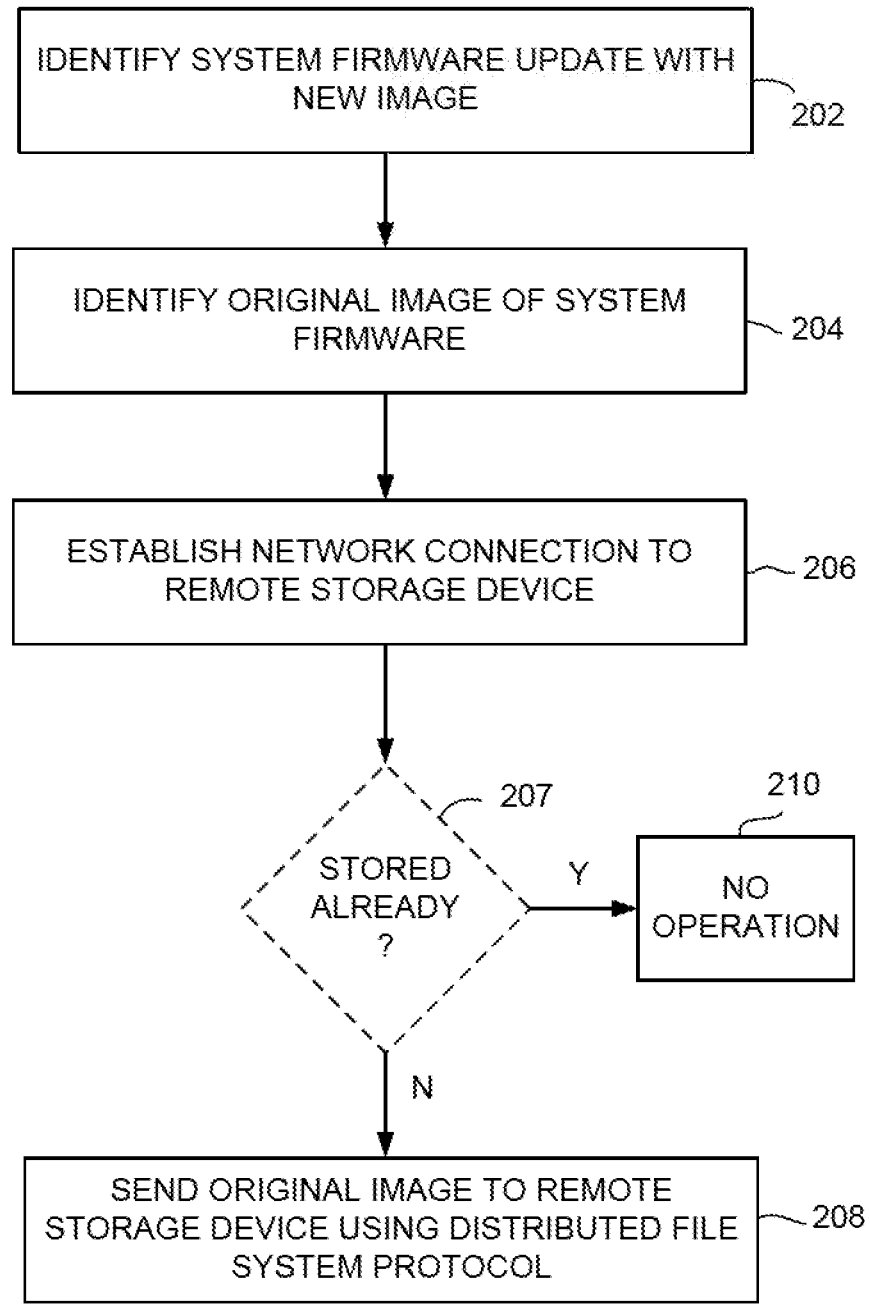
FIG. 2 is a flow chart depicting a method of preserving a system firmware image on a computer according to an example implementation.

FIG. 2 is a flow chart depicting a method 200 of preserving a system firmware image on a computer according to an example implementation. The method 200 may be understood with reference to the computer 100 shown in FIG. 1. The method 200 begins at step 202, where it is identified that the system firmware 114 is to be updated with a new image. In an example, the management processor 104 can identify that the image 116 is about to be updated. In one example, the OE 118 executing on the management processor 104 is used to invoke the process for updating the image 116, thus providing the indication that the image 116 is about to be updated. In another example, the update process can be invoked by the CPU 102 executing the boot/flash code 122. In such an example, the boot/flash code 122 can include inform the OE 118 executing on the management processor 104 of the impending update process. For example, the boot/flash code 112 can invoke an application programming interface (API) of the OE 118 before commencing the update process.

At step 204, an original image of the system firmware 114 is identified. In an example, having identified that an update is to occur, the OE 118 of the management processor 104 can obtain an identifier associated with the image 116 from the system firmware 114. This identifier serves to identify an original image of the system firmware 114 (e.g., a version identifier).

At step 206, a network connection is established to a remote storage system. In an example, the OE 118 of the management processor 104 implements a network protocol stack for establishing network communication through the network interface 112. For example, the OE 118 can provide a TCP/IP stack for communicating with the remote storage system over a TCP/IP network.

At step 208, the original image of the system firmware 114 is sent to the remote storage system using a distributed file system protocol. In an example, the OE 118 of the management processor 104 can obtain a copy of the image 116. The OE 118 can use a distributed file system protocol to store the original image to the remote storage system over the established network connection. Example distributed file system protocols include the Network File System (NFS), Common Internet File System (CIFS) (e.g., Server Message Block (SMB)), or the like. In another example, the distributed file system protocol includes a cloud-based protocol. For example, the OE 118 can invoke an application programming interface (API) to allocate storage, store images, and retrieve images from the remote storage system using the cloud-based protocol.

In this manner, the computer 100 can preserve an original image of the system firmware 114 prior to updating to a new image. The original image is stored remotely on a storage system. Several computers similar to the computer 100 can preserve images of system firmware to the remote storage system thereby establishing a system firmware repository on the remote storage system. In some examples, the firmware repository only stores unique system firmware images. In such a case, the method 200 can include step 207 between steps 206 and 208. At step 207, a determination is made whether the remote storage system already stores a copy of the original image. In an example, the OE 118 of the management processor 104 can use the distributed file system protocol to search the remote storage system for the original firmware based on the identifier obtained in step 204. If the remote storage system already stores the original image, the method 200 can proceed to step 210, where no operation is performed (i.e., the backup of the original image is not necessary). Otherwise, the method 200 proceeds to step 208 as described above.

Figure 3:
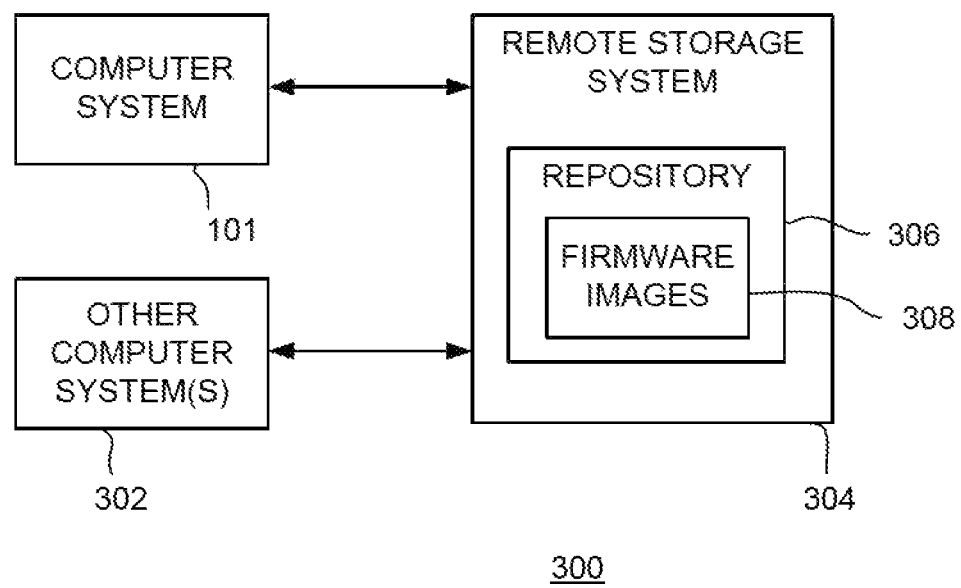
FIG. 3 is a block diagram of a networked computer system according to an example implementation.

FIG. 3 is a block diagram of a networked computer system 300 according to an example implementation. The system 300 includes the computer 101, at least one other computer 302, and a remote storage system 304. The remote storage system 304 can include any number of storage devices of various types, such as hard disk drives, solid state drives (SSDs), NAND-Flash drives, and like type persistent storage devices. The remote storage system 304 stores a system firmware repository ("repository 306"). The repository 306 includes a plurality of system firmware images ("firmware images 308") for use by the computer system 101 and the computer systems 302. In an example, the repository 306 stores unique firmware images (e.g., each of the firmware images 308 is a different version). The computer system 101 can preserve original images of system firmware in the repository 306 before each update to the system firmware, as described above. Likewise, the computer systems 302 can preserve system firmware images to the repository 306.

Figure 4:
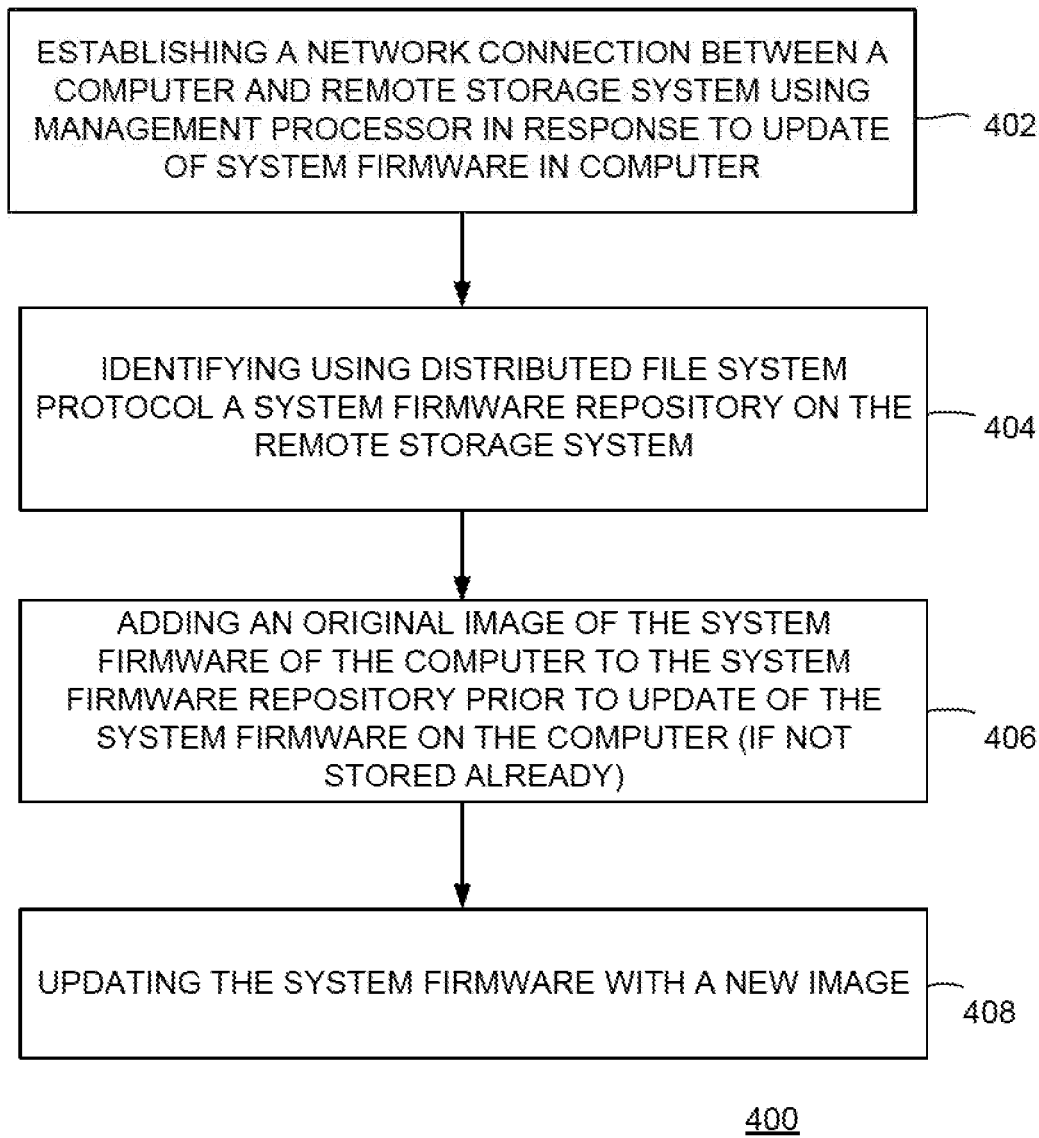
FIG. 4 is a flow diagram depicting a method of maintaining system firmware images according to example implementation.

FIG. 4 is a flow diagram depicting a method 400 of maintaining system firmware images according to example implementation. The method 400 may be understood with reference to FIGS. 1 and 3. The method 400 begins at step 402, where a network connection is established between a computer (e.g., the computer 101) and the remote storage system 304 in response to a request to update system firmware of the computer 101 with a new image. The computer can establish the network connection using its management processor, as described above. At step 404, the computer 101 identifies the repository 306 on the remote storage system 304 using a distributed file system protocol. Similar to step 402, the computer 101 can use its management processor to locate the repository 306 using the distributed file system protocol.

At step 406, the computer 101 adds an original image of the system firmware to the repository 306 prior to the update of the system firmware with the new image. In an example, the computer 101 only adds the original image to the repository 306 if such original image is not already stored in the repository 306. The computer 101 can use its management processor to facilitate the transfer of the original image to the remote storage system 304 using the distributed file system protocol. At step 408, the computer 101 updates its system firmware with the new image.

In some cases, after an update to a new firmware image, a replacement image is required. For example, the computer may fail to boot with the new firmware image. In another example, the computer may boot, but fail to operate properly or as expected with the new firmware image. In such cases, the computer or the user of the computer can determine that the system firmware should be updated with a replacement image that is known to be bootable.

Figure 5:
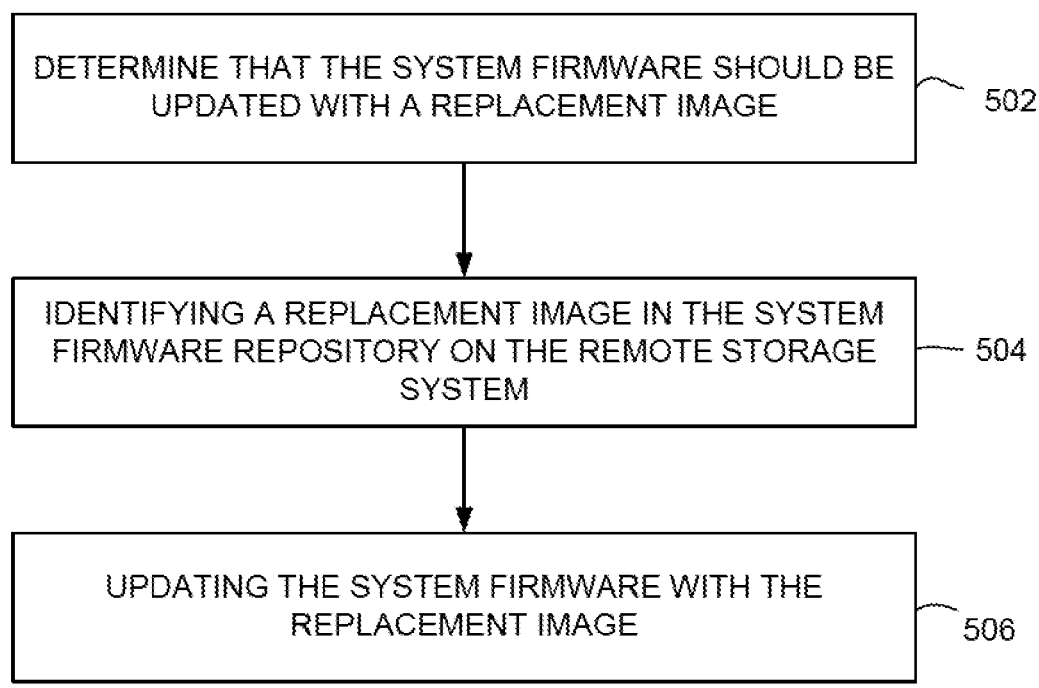
FIG. 5 is a flow diagram depicting a method of restoring a system firmware image according to an example implementation.

FIG. 5 is a flow diagram depicting a method 500 of restoring a system firmware image according to an example implementation. The method 500 can be understood with reference to FIGS. 1 and 3. The method 500 begins at step 502, where a computer (e.g., the computer 101) or a user of the computer determines that the system firmware should be updated with a replacement image. For example, referring to the computer 101 of FIG. 1, the OE 118 of the management processor 104 can determine that the computer 101 failed to boot. In another example, a user may notice the computer 101 does not operate properly or as expected.

At step 504, a replacement image in the repository 306 of the remote storage system 304 is identified. In an example, the OE 118 on the management processor 104 can be used to select a replacement image. The OE 118 can automatically select a replacement image. For example, the OE 118 can select the previous image from which the computer 101 booted. The firmware images 308 can each include a tag indicating whether such images have been successfully booted. The OE 118 can automatically select a firmware image that has successfully booted on a computer. In another example, a user can interact with the OE 118 to retrieve a list of possible firmware images in the repository 306. The user can instruct the OE 118 using either a graphic user interface (GUI) or command line interface (CLI). In this manner, the OE 118 can identify a replacement image.

At step 506, the system firmware is updated with the replacement image. In an example, the OE 118 executing on the management processor 104 can invoke the update process to update the image 116 on the system firmware 114 with the replacement image.

The methods described above may be embodied in a computer-readable medium for configuring a computing system to execute the method. The computer readable medium can be distributed across multiple physical devices (e.g., computers). The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory. RAM, etc., just to name a few. Other new and various types of computer-readable media may be used to store machine readable code discussed herein.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of preserving a system firmware image on a computer, comprising:

identifying that system firmware on the computer is to be updated with a new image;

identifying an original image of the system firmware using a management processor of the computer, wherein the management processor includes a baseboard management controller (BMC);

establishing a network connection to a remote storage system through a network interface of the computer using the management processor; and sending, by the management processor of the computer, the original image through the network connection to the remote storage system using a distributed file system protocol.

2. The method of claim 1, further comprising:

executing, by the management processor of the computer, code to update the system firmware with the new image on the management processor;

wherein the management processor obtains the original image stored in the system firmware prior to the system firmware being updated with the new image.

3. The method of claim 1, further comprising:

executing, by the management processor of the computer, code to update the system firmware with the new image on a central processor unit (CPU) of the computer; and invoking, by the management processor of the computer, an application programming interface (API) of an operating environment executing on the management processor to obtain the original image stored in the system firmware prior to the system firmware being updated with the new image.

4. The method of claim 1, further comprising:

prior to sending the original image, identifying, by the management processor of the computer, that the storage system does not have the original image stored thereon.

5. The method of claim 1, wherein the distributed file system protocol comprises a Network File System (NFS) protocol.

6. The method of claim 1, wherein the step of sending comprises invoking an application programming interface (API) to allocate storage on the remote storage system and store the original image on the remote storage system using a cloud-based protocol.

7. A computer system, comprising:

a central processing unit (CPU);

system firmware to be used by the CPU to boot the computer system;

a network interface; and a management processor, including a baseboard management controller (BMC), to preserve an original image of the system firmware in response to a new image that is to update the system firmware by obtaining an identifier associated with the original image, using the identifier to search for the original image on a system firmware repository stored by a remote storage system and, upon determining that the original image does not exist on the system firmware repository, adding the original image to the system firmware repository using a distribute file system protocol through the network interface.

8. The computer system of claim 7, wherein the management processor, prior to adding the original image to the system firmware repository, identifies that the system firmware repository does not have the original image stored therein.

9. The computer system of claim 7, wherein the management processor determines that the system firmware should be updated with a replacement image, obtains the replacement image from the system firmware repository using the distributed file system protocol, and updates the system firmware with the replacement image.

10. The computer system of claim 9, wherein the management processor determines that the new image of the system firmware failed to boot the computer system.

11. A method of maintaining system firmware images, comprising:
   establishing a network connection between a computer and a remote storage system, through a network interface of the computer, using a management processor of the computer in response to a request to update system firmware of the computer with a new image, the management processor including a baseboard management controller (BMC);
   the management processor identifying a system firmware repository stored by the remote storage system;
   the management processor adding an original image of the system firmware to the system firmware repository, using a distributed file system protocol over the network connection, prior to the update of the system firmware; and
   updating the system firmware with the new image.

12. The method of claim 11, further comprising:
   the management processor determining that the system firmware repository does not have a copy of the original image already stored therein.

13. The method of claim 11, further comprising:
   determining that the system firmware of the computer should be updated with a replacement image;
   the management processor identifying, using the distributed file system protocol, the replacement image in the system firmware repository on the remote storage system; and
   updating the system firmware of the computer with the replacement image.

14. The method of claim 13, wherein the step of determining that the system firmware of the computer should be updated comprises identifying that the computer failed to boot using the new image, and wherein the replacement image comprises the original image.

15. The method of claim 13, wherein each image in the system firmware repository includes a tag indicative of whether such image has successfully booted a computer, and wherein the tag of the replacement image does indicate that the replacement image has successfully booted a computer.

16. The method of claim 1, wherein the management processor of the computer is separate from a central processor of the computer.

17. The method of claim 1, wherein the identifying the original image includes obtaining, by the management processor of the computer, an identifier associated with the original image.

18. The method of claim 17, wherein, prior to sending the original image to the remote storage system, searching, by the management processor of the computer, the remote storage system for the identifier associated with the original image.

19. The method of claim 1, further comprising:
   updating the system firmware on the computer with the new image;
   determining that the system firmware requires updating with a replacement image;
   searching the remote storage system for the replacement image; and
   updating the system firmware on the computer with the replacement image.

20. The method of claim 19, wherein the replacement image is the original image.

* * * * *